United States Patent
Palazzolo et al.

(10) Patent No.: US 6,323,614 B1
(45) Date of Patent: Nov. 27, 2001

(54) SYSTEM AND METHOD FOR CONTROLLING SUSPENSION USING A MAGNETIC FIELD

(75) Inventors: Alan Palazzolo, College Station, TX (US); Mu Li, Fremont, CA (US); Uhn Joo Na, College Station; Erwin Thomas, Bryan, both of TX (US)

(73) Assignee: The Texas A&M University System, College Station, TX (US)

( * ) Notice: Subject to any disclaimer, the term of this patent is extended or adjusted under 35 U.S.C. 154(b) by 0 days.

(21) Appl. No.: 09/390,250

(22) Filed: Sep. 3, 1999

Related U.S. Application Data
(60) Provisional application No. 60/099,172, filed on Sep. 4, 1998.

(51) Int. Cl.$^7$ .............................. G05B 19/29; G05B 11/01
(52) U.S. Cl. .......................... 318/560; 318/601; 318/618; 318/611; 318/621
(58) Field of Search ...................... 318/138, 139, 318/245, 254, 560–696; 310/90, 90.5, 74

(56) References Cited

U.S. PATENT DOCUMENTS

| | | | |
|---|---|---|---|
| 3,974,699 | * 8/1976 | Morris et al. | |
| 4,228,396 | * 10/1980 | Palombo et al. | 324/163 |
| 4,295,171 | * 10/1981 | Hirota et al. | 360/73 |
| 4,575,666 | * 3/1986 | Nakashima et al. | 318/661 |
| 4,633,423 | * 12/1986 | Bailey | 364/571 |
| 4,686,404 | * 8/1987 | Nakazeki et al. | 310/90.5 |
| 4,712,853 | * 12/1987 | Howard. | |

(List continued on next page.)

FOREIGN PATENT DOCUMENTS 59-151619 * 8/1984 (JP).

OTHER PUBLICATIONS

Kirk, J., et al; "Performance of a Magnetically Suspended Flywheel Energy Storage System;", Dec. 1995.

Okada, Y., et al.; "Cross Feedback Stablization of the Digitally Controlled Magnetic Bearing;" Journal of Vibration and Acoustics, vol. 114, pp. 54–59, Jan. 1992.

Bichler, U. J.; "A Low Noise Magnetic Bearing Wheel for Space Application;" 2$^{nd}$ International Symposium on Magnetic Bearings, Tokyo, Japan; pp. 1–8, Jul. 12–14, 1990.

Cheol–Soon Kim, et al.; "In–situ Runout Indentification in Active Magnetic Bearing System by Extended Influence Coefficient Method;" Fifth International Symposium on Magnetic Bearings; all, Aug. 1996.

Kondoleon, A. S., et al.; "Magnetic Bearings at Draper Laboratory ," Proceedings of MAG '95, Technomic Pub.,; pp. 197–206.

Pang, D.–C.; "Power Losses in Magnetic Bearing System for Flywheel Energy Storage;" Proceedings of MAG '95; Technomic Pub., pp. 353–362.

Abrens, M., et al.; "Cross Feedback Control of a Magnetic Bearing System;" pp. 177–191, No Date.

(List continued on next page.)

*Primary Examiner*—Paul Ip
(74) *Attorney, Agent, or Firm*—Baker Botts L.L.P.

(57) ABSTRACT

A system for controlling the position of a rotating member suspended using a magnetic field includes at least one sensor that is operable to detect the position of the rotating member, the sensor further being operable to generate a position reference signal in response to the detected position. The system also includes a controller in communication with the at least one sensor and being operable to generate an actuator control signal in response to receiving the position reference signal. The controller is operable to introduce a phase lead in the actuator control signal in response to a rotational speed of the rotating member. The system further includes at least one actuator in communication with the controller that is operable to adjust the position of the rotating member in response to the actuator control signal by modifying characteristics of the magnetic field.

25 Claims, 5 Drawing Sheets

U.S. PATENT DOCUMENTS

| | | | | |
|---|---|---|---|---|
| 4,999,534 | * | 3/1991 | Andrianos | 310/90.5 |
| 5,107,192 | * | 4/1992 | Kirchberg et al. | 318/540 |
| 5,126,641 | * | 6/1992 | Putman et al. | 318/128 |
| 5,256,952 | * | 10/1993 | Yoneyama et al. | 318/629 |
| 5,304,907 | * | 4/1994 | Abe et al. | 318/611 |
| 5,329,216 | * | 7/1994 | Hasegawa et al. | 318/654 |
| 5,708,312 | * | 1/1998 | Rosen et al. | 310/90 |
| 5,736,802 | * | 4/1998 | Ueyama et al. | 310/90.5 |
| 5,783,924 | * | 7/1998 | Kahlman | 318/601 |
| 5,838,123 | * | 11/1998 | Zhao . | |
| 5,998,899 | * | 12/1999 | Rosen et al. | 310/90.5 |

OTHER PUBLICATIONS

Ahrens, M., et al.; "Performance of a Magnetically Suspended Flywheel Energy Storage Device;" IEEE Transactions on Control Systems Technology, vol. 4; pp. 494–502, Sep. 1996.

Ahrens, M., et al.; "Design of a Magnetically Suspended Flywheel Energy Storage Device;" Fourth International Symposium on Magnetic Bearings, pp. 553–558, Aug. 1994.

Murakami, C.; "A Design Method of a Dynamic Compensator of Conical Modes For Magnetic Bearings of a Rigid Spinning Rotor," $2^{nd}$ International Symposium on Magnetic Bearings, Tokyo, Japan; pp. 307–310, Jul. 12–14, 1990.

Bornemann, H., et al.; "A Flywheel for Energy Storage With Frictionless High Temperature Superconductor Bearings;" Fourth International Symposium on Magnetic Bearings, ETH Zurich, pp. 543–545, Aug. 1994.

Jayaraman, C. P., et al; "Rotor Dynamics of Flywheel Energy Storage Systems;" Journal of Solar Energy Engineering, vol. 113, pp. 11–18, Feb. 1991.

Wells, S., et al.; "Manufacturing and Testing of a Magnetically Suspended Composite Flywheel Energy Storage System;" Third International Conference on Magnetic Suspension System, pp. 543–550, No Date.

Ahrens, M., et al.; "Field Experiences With a Highly Unbalanced Magnetically Suspended Flywheel Rotor," 5th International Symposium on Magnetic Bearings, Japan, Tokyo, pp. 110–115, No Date.

Stienmier, J. D., et al.; "Analysis and Control of a Flywheel Energy Storage System With a Hybird magnetic Bearing;" Transactions of the ASME, vol. 119, pp. 650–656, Dec. 1997.

* cited by examiner

SYSTEM AND METHOD FOR CONTROLLING SUSPENSION USING A MAGNETIC FIELD

RELATED APPLICATIONS

This application claims the benefit of U.S. Provisional Application Ser. No. 60/099,172, filed Sep. 4, 1998.

TECHNICAL FIELD OF THE INVENTION

This invention relates in general to the field of control systems and more particularly to a system and method for controlling suspension using a magnetic field.

BACKGROUND OF THE INVENTION

Flywheels are energy storage devices competitive with electrochemical batteries. Their advantage is greatly increased when they are suspended magnetically without physical contact with machinery housing, as is typical with rolling element or fluid film bearings. Magnetic suspension greatly decreases power losses due to bearing drag torque in comparison with rolling element or fluid film bearings. Many applications of flywheels require compact size and low weight, while maintaining a high level of stored energy. One difficulty experienced with employing magnetic suspension with flywheels, as well as many other applications, is the instability of a control system when confronted with a member or shaft that rotates at high speeds.

In addition to the particular application of flywheels, there is a need for stable magnetic suspension systems in many applications utilizing high speed rotating shafts or other members. For example, momentum wheels are an important and effective means of controlling the attitude of orbital satellites. Similar problems are also experienced with turbo compressors for air conditioning units utilized on aircraft and in other high performance vehicles. Turbomolecular vacuum pumps are another example of an application that would benefit from a stable magnetic suspension system for high speed rotating shafts. Many other applications may also benefit from the development of a stable magnetic suspension system that may be used to control rotating machinery for industrial and military applications. The instability of such magnetic suspension systems for high speed applications inherently limit such development.

SUMMARY OF THE INVENTION

In accordance with the present invention, a system and method for controlling suspension using a magnetic field are disclosed that address disadvantages and problems associated with previous control methods and systems.

In one embodiment of the present invention, a system for controlling the position of a rotating member suspended using a magnetic field includes at least one sensor that is operable to detect the position of the rotating member. The sensor is further operable to generate a position reference signal in response to the detected position. The system also includes a controller in communication with the at least one sensor. The controller is also operable to generate an actuator control signal in response to receiving the position reference signal. The controller is further operable to introduce a phase lead in the actuator control signal in response to a rotational speed of the rotating member. The system further includes at least one actuator in communication with the controller. The actuator is operable to adjust the position of the rotating member in response to the actuator control signal by modifying characteristics of the magnetic field.

In another embodiment of the present invention, a method of controlling the position of a rotating member suspended using a magnetic field includes generating a position reference signal in response to a detected position of the rotating member. The method also determines an actuator control signal in response to the position reference signal. The actuator control signal includes a phase lead introduced in response to a rotational speed of the rotating member. The method adjusts the position of the rotating member in response to the actuator control signal by modifying characteristics of the magnetic field.

In yet another embodiment of the present invention, a system for controlling the position of a rotating member suspended using a magnetic field includes at least one sensor that is operable to detect the position of the rotating member. The sensor is further operable to generate a position reference signal in response to the detected position. The system also includes a summer in communication with the at least one sensor and being operable to compare the position reference signal to a targeted position value. The system further includes control logic in communication with the summer. The control logic is operable to generate a control output signal in response to the compared position reference signal and targeted position value. The system also includes at least one gain compensator in communication with the control logic. The gain compensator is operable to introduce gain in the control output signal. The system additionally includes at least one lead compensator in communication with the gain compensator. The lead compensator is operable to introduce phase lead in the control output signal. The system further includes at least one actuator responsive to the lead compensator that is operable to adjust the position of the rotating member in response to the control output signal by modifying characteristics of the magnetic field.

BRIEF DESCRIPTION OF THE DRAWINGS

For a more complete understanding of the present invention and the advantages thereof, reference is now made to the following description taken in conjunction with the accompanying drawings, in which.

DETAILED DESCRIPTION OF THE INVENTION

Embodiments of the present invention are illustrated in FIGS. 1–4, like numerals being used to refer to like and corresponding parts of the various drawings.

Figure 1:
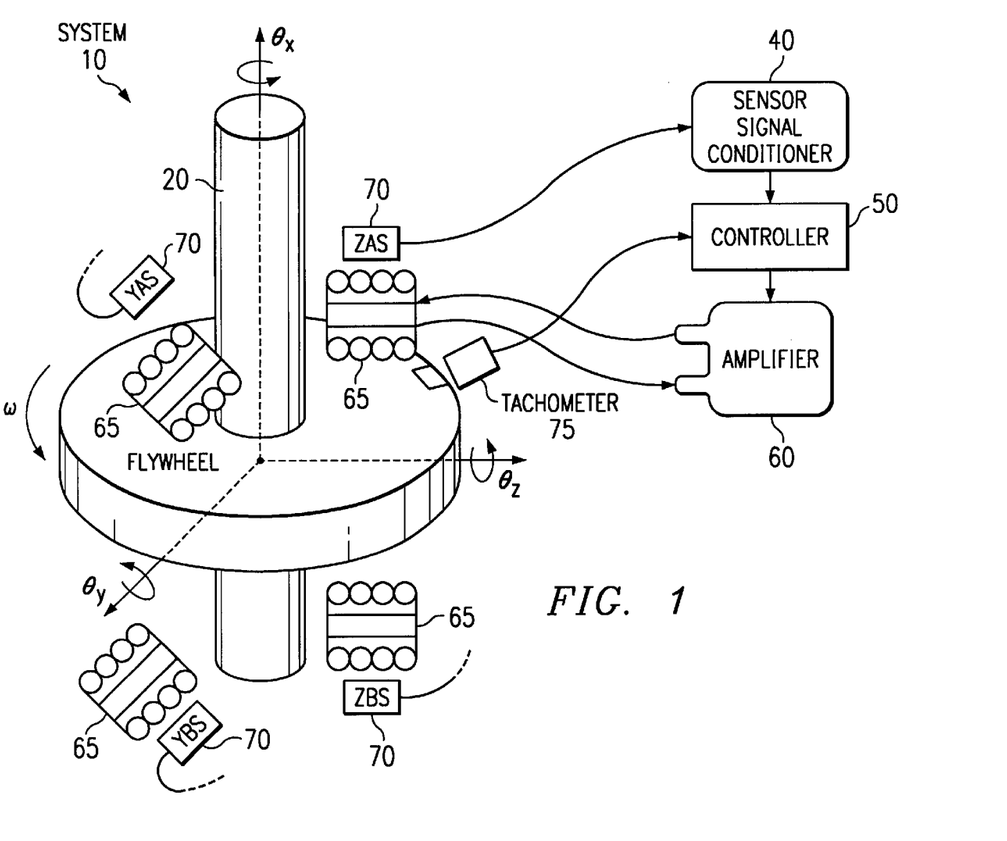
FIG. 1 illustrates a block diagram of a magnetic bearing control system implemented according to the teachings of the present invention.

FIG. 1 illustrates one embodiment of a magnetic bearing control system 10 for a flywheel 15 mounted on a shaft 20. In this example, shaft 20 is coupled to a rotating machine 30. In general, system 10 controls the rotation of flywheel 15 while ensuring that such control does not become unstable due to, for example, excessive vibration from, or resultant torques created by, the rotation of flywheel 15 and shaft 20.

System 10 includes a sensor signal conditioner 40 communication with sensors 70 and a controller 50. System also includes a tachometer 75 and an amplifier 60, both in communication with controller 50. Amplifier 60 is also in communication with actuators 65.

In the described embodiment, flywheel 15 comprises composite threads of fiber such as, for example, carbon; however, flywheel 15 may be composed of other suitable materials depending on the particular application. Flywheel 15 is generally cylindrical or discus shaped such that the outermost edge or surface of flywheel 15 is rounded to form a circumference. System 10 may be used with other suitable rotating members or machinery, and is not limited to the particular example of a flywheel described herein.

In the described embodiment, shaft 20 is a metal shaft upon which flywheel 15 is fixedly mounted; however, shaft 20 may be any material suitable for use in a particular application employing a magnetic suspension system.

Rotating machine 30 is a motor/generator in the described embodiment; however, rotating machine 30 may also be a motor, generator, turbine, or any other suitable rotating machine. In one embodiment, rotating machine 30 is a motor/generator that is operable to charge flywheel 15 during a first period and be driven by flywheel during other periods.

In the described embodiment, sensor signal conditioner 40 is a digital controller that implements control logic operable to convert an incoming position indication from sensors 70 to a position reference signal used by controller 50 as feedback to control the rotation of flywheel 15; however, sensor signal conditioner 40 may be implemented using a digital signal processor, digital and/or analog circuitry, or any other suitable combination of hardware and/or software. Sensor signal conditioner 40 may be a standalone component or may be integrated with sensors 70 or controller 50.

In the described embodiment, sensors 70 are position sensors operable to indicate or signal a position or change in position of shaft 20 or flywheel 15 to sensor signal conditioner 40 and/or controller 50; however, sensors 70 may be any other suitable sensor or detector. For example, in one embodiment, sensors 70 may be inductive sensors generating a back electromotive force that is caused by the vibration of flywheel 15 in a magnetic field created by sensors 70. Other electrical, capacitive, optical, eddy current, or motion sensing devices may be utilized to indicate the position of flywheel 15 or shaft 20.

Controller 50 is one or more digital signal processors in the described embodiment; however, controller 50 may be any other suitable controller utilizing analog or digital circuitry, a controller combining both digital and analog aspects, or a processor utilizing control equations stored in memory and executed in software routine to effect control of system 10. Other suitable control devices may be utilized for controller 50 depending on the requirements of a particular magnetic suspension system.

In the described embodiment, amplifier 60 is a power amplifier used to step up control signals supplied by controller 50 in order to drive electrical current through actuators 65. Amplifier 60 may be any other amplifier or suitable device sufficient to convert outputs from controller 50 into inputs sufficient to drive actuators 65. In one embodiment, amplifier 60 is integrated with individual actuators 65.

In the described embodiment, actuators 65 are inductive coils utilizing current flow to generate and effect changes in a magnetic field around shaft 20 to create magnetic bearings. However, actuator 65 may be any other actuator suitable for creating a magnetic field to provide such bearings around shaft 20.

In operation, sensors 65 detect the rotational position of shaft 20 and flywheel 15. Sensors 70 provide inputs indicative of such position to sensor signal conditioner 40, which in turn generates reference voltages used by controller 50 to control the rotation and position of flywheel 15 and shaft 20. More specifically, controller 50 utilizes the reference voltages to generate actuator control signals that are communicated to amplifier 60. The actuator control signals are responsive to changes in the rotational speed of flywheel 15 which are indicated by tachometer 75. According to the teachings of the present invention, controller 50 introduces a phase lead in the actuator control signals in order to prevent system 10 from becoming unstable when flywheel 15 rotates at high speeds. The performance of controller 50 is further described in reference to FIG. 2. Amplifier 60 amplifies or steps up the actuator control signals in order to drive actuator 65. Actuators 65 generate and effect changes in a magnetic field around portions of shaft 20 in order to control the translational position of flywheel 15 as it rotates. Thus, by introduction of a phase lead into the actuator control signals, controller 50 achieves a stable magnetic suspension system at high rotational speeds of flywheel 15.

Figure 2:
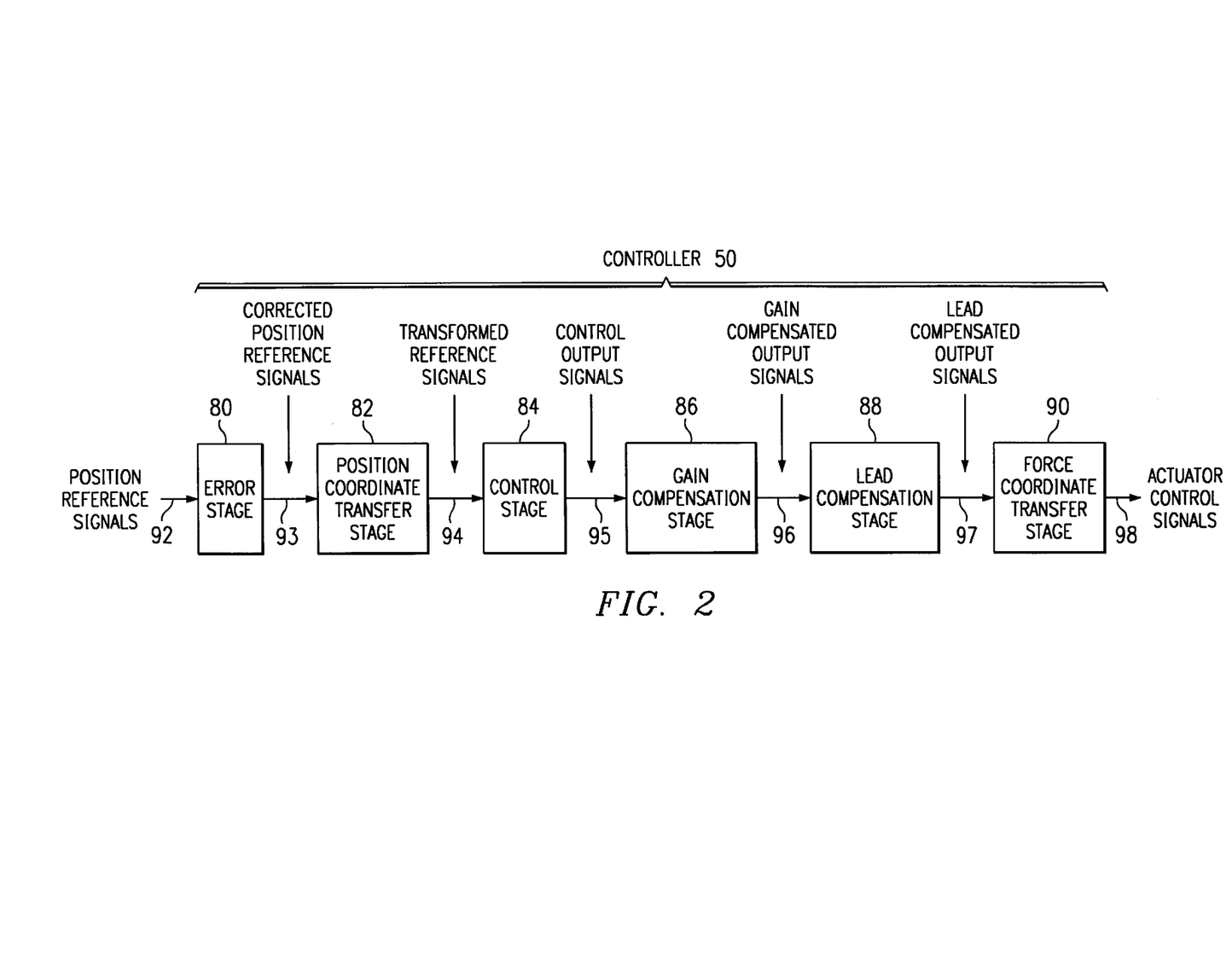
FIG. 2 illustrates one embodiment of stages utilized within a controller used in the system of FIG. 1.

FIG. 2 illustrates a simplified block diagram of one embodiment of the logic present in controller 50 shown in FIG. 1. Controller 50 includes an error stage 80, a position coordinate transfer stage 82, a control stage 84, a gain compensation stage 86, a lead compensation stage 88, and a force coordinate transfer stage 90. Stages 80 through 90 utilize position reference signals 92 in order to generate actuator control signals 98 that are eventually used to drive actuators 65 in FIG. 1. As described in FIG. 1 with reference to controller 50, stages 80 through 90 are implemented using one or more digital signal processors or, alternatively, using any other suitable combination of devices and components, whether digital or analog in nature. In one embodiment, the logic present within stages 80 through 90 is implemented using software stored in memory and executed upon by a processor.

In operation, error stage 80 compares position reference signals 92 to target position values indicative of a desired shaft position and may also correct errors caused by runout. Runout is the difference between the sensed position of shaft 20 and the actual position of shaft 20 at any given instant in time. Runout may be introduced by out of roundness of shaft 20, electrical, magnetic, or optical non-uniformity, or physical or sensory errors introduced prior to controller 50 receiving position reference signals 92. Outputs of the comparison done by error stage 80 are corrected position reference signals 93, each of which represent a differential between sensed and desired shaft position after runout correction.

Position coordinate transfer stage 82 transforms corrected position reference signals 93 from sensor positional coordinates to center of mass coordinates so that both translational movement and rotational movement may be independently controlled. Thus, whereas the original position reference signals 92 represent the position of shaft 20 relative to sensors 70, transformed reference signals 94 provide a more accurate representation of the rigid body coordinates of flywheel 15 and shaft 20.

Control stage 84 receives transformed reference signals 94 from position coordinate transfer stage 82 and employs a proportional derivative control scheme to generate control output signals 95 that are eventually used to drive actuators 65. Alternatively, control stage 84 may utilize a proportional-integral-derivative controller, some subcombination of proportional, integral and/or derivative control components, a PIDD, state based, or plant based control scheme, or other suitable control schemes.

Gain compensation stage 86 multiplies control output signals 95 by direct and/or cross axis gains in order to increase the suspension stiffness and damping of system 10 and thereby better accomplish independent control of forces and torques in the cylindrical and conical directions respectively.

The resultant gain compensated output signals 96 from gain compensation stage 86 are received by lead compensation stage 88 in order to introduce phase lead to track a high frequency vibration of flywheel 15 as the rotational speed of flywheel 15 increases. The phase lead introduced by lead compensation stage 88 in effect pulls the high frequency pole associated with the vibration of flywheel 15 sufficiently away from the imaginary axis in the left-hand eigenvalue plane in order to achieve a more stable control system. The high frequency pole is associated with either backward or forward conical whirling of flywheel 15 and is often referred to as the nutation mode of shaft 20. In such a manner, an exponentially increasing vibration that may lead to the instability of system 10 is suppressed by lead compensation stage 88 in order to allow system 10 to more accurately suspend shaft 20 at high rotational speeds of flywheel 15 and shaft 20.

Lead compensation stage 88 may utilize tracking lead compensators that continuously change control logic in order to assure that the lead compensator's maximum phase lead frequency tracks the high frequency pole as the rotational speed of flywheel 15 and shaft 20 changes.

Lead compensation stage 88 may also include notch filters that are positioned in the frequency domain such that the notch filters' center frequency is kept close to the spin frequency of shaft 20 and below the frequency of the high frequency pole as the rotational speed of shaft 20 changes. Such a placement of a notch filter may contribute an additional source of significant phase lead in order to stabilize the high frequency pole corresponding to an increasingly unstable vibration of flywheel 15 and shaft 20 at high rotational speeds. Lead compensation stage 88 thus provides lead compensated output signals 97 that prevent system 10 from becoming unstable at high rotational speeds of flywheel 15 and shaft 20. Lead compensation stage 88 and the logic utilized to introduce phase lead in lead compensated output signals 97 are further described with reference to FIGS. 3A and 3B.

Force coordinate transfer stage 90 receives lead compensated output signals 97 and transforms the lead compensated output signals 97 from the rigid body coordinates utilized by the control logic in stages 84 through 88 into bearing force signals embodied in actuator control signals 98 to be physically applied to the shaft by magnetic bearings effected by actuators 65. Actuator control signals 98 eventually adjust the moment at the center of mass of flywheel 15 that are demanded by controller 50. Thus, force coordinate transfer stage 90 produces actuator control signals 98 which may be used directly, or after being amplified, to actuate a change in the position of shaft 20, and thus flywheel 15, through actuator 65.

Figure 3A:
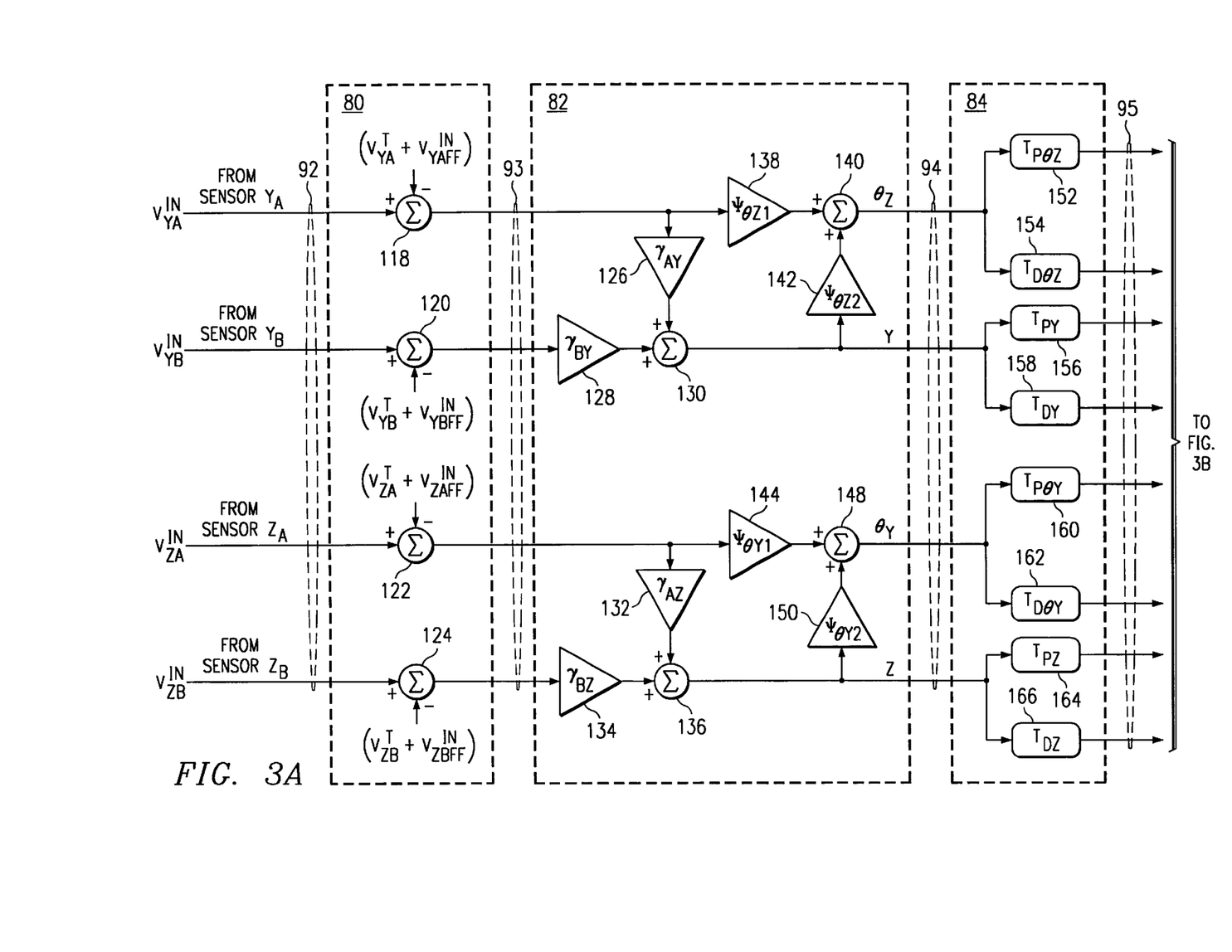
FIGS. 3 and 3B illustrate a more detailed logic diagram of the stages of the controller shown in FIG. 2.
Figure 3B:
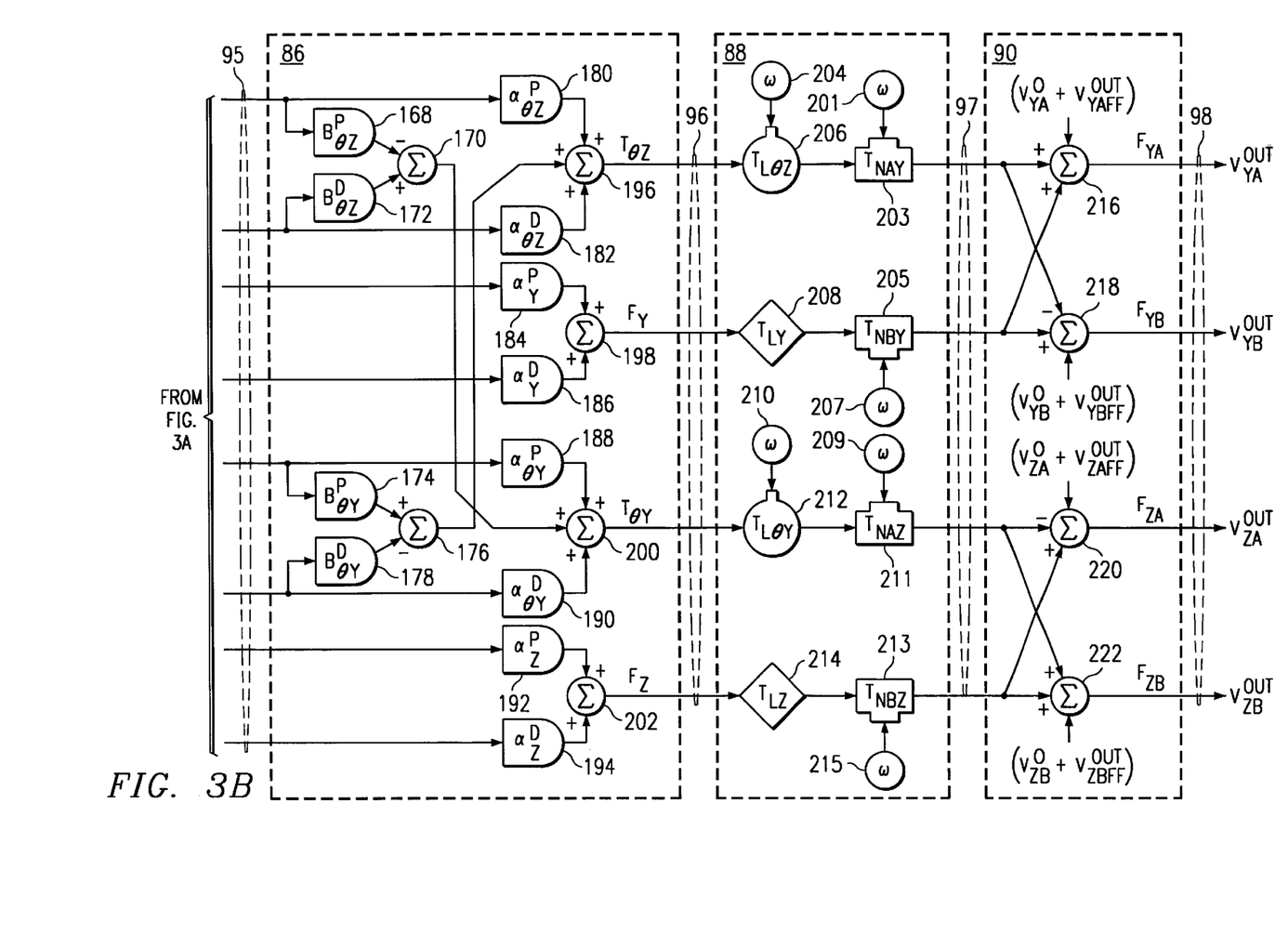

FIGS. 3A and 3B illustrate one embodiment of a more detailed logical diagram of the stages of controller 50 that are illustrated generally in FIG. 2. As discussed with reference to FIG. 2, the logic described operationally in FIGS. 3A and 3B may be implemented using digital signal processors or, alternatively, may be implemented using digital or analog control circuitry, a processor accessing instructions stored in memory, or any other suitable combination of hardware or software.

In the described embodiment, error stage 80 receives position reference signals 92 and uses summers 118, 120, 122, and 124 to compare each of position reference signals 92 at a positive input of one of summers 118, 120, 122 or 124 to the sum of a targeted position value and a feedforward input at a negative input of one of summers 118, 120, 122 or 124. The targeted position value corresponds to a desired or targeted position of shaft 20 while the feedforward input corrects and compensates for runout error. Summers 118 through 124 deliver corrected position reference signals 93, which represent the difference between the actual detected position compensated for runout and a targeted position of shaft 20, to position coordinate transfer stage 82.

Position coordinate transfer stage 82 transforms corrected position reference signals 93 to center of mass coordinates such that both translational movement and rotational movement may be independently controlled. Gain devices 126, 128, 132, 134, 138, 142, 144, and 150 introduce appropriate gain such that corrected position reference signals 93 may be summed with a particular gain magnitude using summers 130, 136, 140 and 148. Thus, four signals, each representative of a position value for a particular sensor 70, are converted into transformed referenced signals 94 such that the four signals represent positional data relative to the coordinate system y, z, $\theta_y$, and $\theta_z$ as shown relative to the three dimensional axis illustrated in FIG. 1.

Transformed referenced signal 94 is then received by control stage 84 in order to generate control output signals 95. In particular, control stage 84 may use some combination of the elements generally present within a proportional integral derivative controller. For example, as shown in FIGS. 3A and 3B, control stage 84 includes proportional compensators 152, 156, 160, and 164, as well as derivative compensators 154, 158, 162, and 166. Although integral compensators are not shown in FIG. 3, such compensators may easily be integrated in parallel with the illustrated components of control stage 84. In one embodiment of the present invention, rather than running a position indicator through a derivative compensator as described, a velocity reference signal may be utilized directly from a velocity sensor used to detect the velocity of vibrations of shaft 20, for example. After transformed referenced signals 94 are utilized within the proportional and derivative control schemes of compensators 152 through 166, control stage 84 produces control output signals 95 that will eventually be modified and transformed as the basis for actuator control signals 98 used to drive actuator 70. Compensators 152 through 166 may also include low pass filtering.

Control output signals 95 are multiplied by gain components in gain compensation stage 86 in order to increase stiffness and damping to control torque and reduce vibrations of flywheel 15 and shaft 20 in both cylindrical and conical directions. More particularly, gain compensators 168, 172, 174, and 178 are used to introduce cross axis gains in order to reduce the so-called gyroscopic effect or cross-planar torques. Such cross planar torques are exacerbated during high speed rotation of flywheel 15 and shaft 20 such that conical movement or vibration of flywheel 15 causes instability in system 10. Such cross axis gains allow controller 50 to rapidly respond to such cross planar torques in order to maintain stability. Direct axis gain compensators 180, 182, 184, 186, 188, 190, 192, and 194 similarly work to increase stiffness of direct axis suspension and achieve rapid damping of translational vibrations and reduce torque in a conical direction.

Summers 170 and 176 are used in gain compensation stage 86 to sum cross axis gains from gain compensators 168 and 172, and gain compensators 174 and 178. In particular, gain introduced by gain compensator 168 is provided as a negative input and added to gain introduced from gain compensator 172 at a positive input. Likewise, gain introduced from gain compensator 178 is added at a negative input of summer 176 to the positive input provided by gain compensator 174. The summed output from summer 170 is provided from a portion of control stage 84 associated with $\theta_x$ in order to generate the torque control signal for the coordinate data $\theta_y$. Likewise, the output of summer 176 associated with coordinate data $\theta_y$ is provided to summer 196 in order to generate the torque control signal or the coordinate data $\theta_z$. Thus, gains from summers 170 and 176 are used to generate control signals for cross axis coordinates.

The torque control signal generated at the output of summer 196 combines positive inputs from direct axis gain compensators 180 and 182, as well as the output of summer 176 from cross gain compensators 174 and 178. In the same way, the torque control signal generated at the output of summer 200 sums signals received from direct gain compensators 188 and 190, as well as a cross gain component from the output of summer 170. Summers 198 and 202 sum direct axis gains from gain compensators 184 and 186, and 192 and 194 respectively. The output from summers 198 and 202 represent "center of mass" force control signals. The torque control signals and center of mass force control signals communicated at the output of summers 196, 198, 200, and 202 are collectively referred to as gain compensated output signals 96 as previously described in FIG. 2.

Gain compensated output signals 96 are received as inputs by lead compensation stage 88. Two substages of lead compensation stage 88 are shown in FIGS. 3A and 3B. Such substages may be used individually or in combination to introduce phase lead into gain compensated output signals 96.

In particular, tracking lead compensators 206 and 212 and stationary lead compensators 208 and 214 collectively make up a first substage of lead compensation stage 88. Tracking lead compensators 206 and 212 are lead compensation stages that adjust the amount of phase lead introduced to gain compensated output signals 96 from summers 196 and 200. In particular, tracking lead compensators 206 and 212 may adjust a maximum phase lead frequency in response to the rotational speed of a rotating member such as flywheel 15 or shaft 20. Such rotational speed is indicated by inputs 204 and 210. Although lead compensators 208 and 214 are shown in FIGS. 3A and 3B as stationary lead compensators, both may easily be made to track high frequency poles associated with increases in a rotational speed of flywheel 15 and shaft 20.

Lead compensators 206, 208, 212, and 214 may utilize traditional lead compensation whereby phase lead is added to a particular signal only over a limited frequency range. Gain of the phase lead compensation increases with phase lead only over the same limited range. Thus, one advantage of lead compensators 204, 208, 212, and 214 over, for example, lead introduced by a derivative controller, is that lead compensators 204, 208, 212 and 214 have a limited range of frequencies in which gain and phase lead is introduced such that they are not subject to an ever increasing gain at high frequencies. As a result, lead compensators 206, 208, 212, and 214 may be introduced in situations where a derivative controller would risk saturation and instability of control system due to noise amplification.

One particular advantage of tracking lead compensators 206 and 212 is the ability to adjust the frequency band of the lead compensator in response to changes in the rotational speed of flywheel 15 and shaft 20. Thus, a compensator employing tracking lead may provide the maximum phase lead for a given pole to zero ratio of a control system at the frequency of the high frequency pole by changing the pole and zero locations of the lead stage as speed changes. The result of such lead compensation is to stabilize the high frequency pole with phase lead centered near the frequency of the high frequency pole.

The transfer function of logic employed by lead compensators 206, 208, 212, and 214 is:

$$T_L = K(S-z)/(S-p) \tag{1}$$

where the ratio of the infinite frequency to zero frequency gains is $$p/z \tag{2}$$

and the frequency at maximum phase lead is:

$$@_{max} = (zp)^{0.5} \tag{3}$$

The constant K is typically selected so that the zero frequency gain equals one, so:

$$K = p/z \tag{4}$$

Hence K represents the infinite frequency gain. Both p and z may be solved for given the maximum phase lead frequency and the allowable infinite frequency gain. A novel feature of the invention is that the maximum phase lead frequency is made to change with speed to be near to the frequency of the high frequency pole, which is highly dependent on machinery speed. The amount of phase lead contributed by the lead stage at $@_{max}$ increases as p/z increases such that it is readily apparent that a compromise may be made between high frequency noise ampliation and phase lead amount. The invention aides this compromise by assuring that the maximum phase lead occurs near the frequency where it is required, i.e. the frequency of the high frequency pole. the p/z ratio, and resulting noise amplification may then be kept at a minimum.

The dependence of $@_{max}$ on speed is determined by the test or simulation identification of the frequency of the high frequency pole. Then p or z are programmed as functions of speed in the digital or analog controller, in order to force $@_{max}$ in (7) selected to be near the frequency of the high frequency pole.

Thus, while both stationary and tracking lead compensators may be utilized to introduced phase lead into gained compensated output signals 96, employing tracking lead compensators 206 and 212 provides a particularly effective means of introducing the maximum amount of phase lead while minimizing the risk of saturation and instability.

Lead compensators stage 88 may also include a substage composed of tracking notch filters 203, 205, 211, and 213. Each of tracking notch filter 203, 205, 211, and 213, like tracking lead compensators 206 and 212, utilize an input indicative of the rotational speed of flywheel 15 in the form of inputs 201, 207, 209, and 215. The notch filter substage is utilized to both reject shaft run out and imbalances and also increase phase gain margins to stabilize the high frequency pole corresponding to the forward conical whirl of flywheel 15.

The continuous form of the notch transfer function used in the notch filter substage is:

$$T_N(S) = (S^2 + a^2)/(S^2 + aS/Q + a^2) \tag{5}$$

This shows that there is zero transmission of the feedback signal at the center frequency "a", hence this stage is called a notch filter. The width of the notch along the frequency axis is governed by the value of "Q": as Q increases the notch width decreases. The novel and effective approach of changing the values of "a" and "Q" as the machine's speed changes is a unique feature of the invention. The high frequency pole changes with speed hence "a" and "Q" are programmed to change with speed to maintain high phase and gain margins for the high frequency pole over the entire speed range of the machine. The most effective dependence of "a" and "Q" on speed is programmed as an equation, i.e.

$$a = a(\text{speed}) \tag{6}$$

$$Q = Q(\text{speed}) \tag{7}$$

in the digital controller, or may be realized with circuits using an analog controller. These equations are selected based on test results or computer simulations, either approach yielding the dependence of the high frequency pole on speed and values of "a" and "Q" that stabilize it. The optimal values of "a" and "Q" may be obtained by trial and error or by some directed optimization search within the test or simulation environments. Implementation of the "tracking" notch stage in a digital controller requires that it be expressed in digital form. This may be done directly or by an emulation technique, i.e. Tustin, Matched Pole-Zero, etc. All approaches yield a difference equation of the form:

$$y_k = a_2 Y_{k-1} - a_3 Y_{k-2} - \ldots - a_{k-m} + b_1 X_k + b_2 X_{K-1} + \ldots + b_{N+1} X_{K-N} \tag{8}$$

where $Y_k$ represents the notch filter stage outputs, $X_k$ the inputs, and the a's and b's are determined from either the direct digital form or the emulation based form of the notch transfer function. This powerful and unique use of a tracking notch in the invention stabilizes the high frequency pole without amplifying high frequency noise.

Thus, the notch compensating substage positions the filter near a frequency located near the high frequency pole. By adjusting the center frequency of the band used by the notch filter, controller 50 may introduce an appropriate phase lead to avoid instability associated with the high frequency pole. By adjusting the values of a and Q as described above, instability previously experienced at high rotational speeds of flywheel 15 may be significantly reduced over previous control systems.

Although tracking notch filters 203, 205, 211, and 213 are each represented as but a single tracking notch filter, a cascade of notch filters may be utilized to reduce harmonics of control currents that needlessly waste power and cause shaft vibration. For example, multiple tracking notch filters centered at the first, second, third, and higher harmonics of spin rate of a rotating member greatly reduce the deleterious effect of runout. Thus, by using a cascade of notch filters according to the teachings of the present invention, yet another cause of saturation that is typically experienced in amplifier 60 and actuator 65 may be substantially reduced. The cascade of notch filters also contributes to the robustness of system 10 due to changes in sensor run out patterns. These changes may be due, for example, to target deterioration from heat or centrifugal forces.

Regardless of whether both substages of lead compensators stage 88 are utilized, the resultant outputs of the stage are referred in FIG. 2 as lead compensated output signals 97. Such lead compensated output signals 97 are then transformed by a force coordinate transfer stage 90 into actuator signals 98. Force coordinate transfer stage 90 transforms the torque control signals and center of mass force control signals to bearing force signals that are to be physically applied to shaft 20 by actuators 65 as magnetic bearings.

During such transformation, lead compensated output signals 97 may be summed with additional signals prior to exiting the controller. For example, as shown in FIG. 3, signals 97 may be added to offset voltages in order to provide bias currents in the electromagnetics or to shift outputs to a more desirable level with the controller or for amplifier 60. Signals 97 may also be added to feed forward control voltages that are used for automatic, electromagnetic mass balancing of shaft 20. After signals 97 have been transformed and added to the described voltages by summers 216, 218, 220, and 222, the resultant outputs are actuator control signals 98 which may then be supplied to amplifier 60 or directly to actuators 65.

Additional embodiments of the stages represented in FIGS. 2 and 3 may be utilized within the scope of the present invention. For example, tracking lead compensators may be employed in series in order to add phase lead to more than one high frequency pole of flywheel 15. Tracking compensators may also include a filter stage to roll off the lead compensator. An example of this would be a tracking lead-lag compensator or a tracking lead-low pass filter compensator.

Multiple lead-lag compensators in series may also be used to provide a more robust controller. The lead compensation scheme imposed in controller 50 may also have both tracking and stationary lead compensators in any combination. Additionally, alternative forms of a lead compensator, or any transfer function possessing phase lead characteristics, may be utilized for tracking compensation of the high frequency poles of flywheel 15.

As previously discussed, control stage 84 does not illustrate an integral control portion. Such integral control may be particularly important if the shaft experiences static or dynamic disturbance forces or moments. Such integral control may also include lag compensation. An integral control component may be placed in the parallel with the proportional and derivative paths in control stage 84. Although certain compensators and components of stages 80 through 90 are presented without relying on the rotational speed of flywheel 15 as an input, all gains in control schema utilized in FIGS. 3A and 3B may be programmed to vary in some predetermined manner with such rotational speed, or with rotational acceleration or some other operational or environmental variable such as temperature, pressure, or other external interference. It may be easily be seen that such gains and components of FIGS. 3A and 3B may be adaptively identified, modified, and selected using one or more neural networks.

Although stages 80 through 90 are identified in a particular order and represented using particular components, the block diagrams representative of FIGS. 2 and 3 may be transformed to a different configuration, placed in a different order, or utilize different components or logical techniques as long as the overall result of the compensation logic remain similar.

With regard to the tracking notch filters 203, 205, 211, and 213 illustrated in FIGS. 3A and 3B, tracking notch filters may be non-symmetric in amplitude and phase angle about the center frequency or may be intentionally placed above or below the high frequency pole of flywheel 15 in order to optimize the phasing gain margins at the high frequency pole or at frequencies of other modes presented by the shaft or the housing. Likewise, any s or z domain transfer function possessing notch characteristics may be employed for tracking notched based phasing gained margin improvement of the high frequency pole. Additionally, if used in combination or individually, the tracking lead compensators and tracking notch filters may be turned off over particular rotational speed ranges of flywheel 15.

Figure 4:
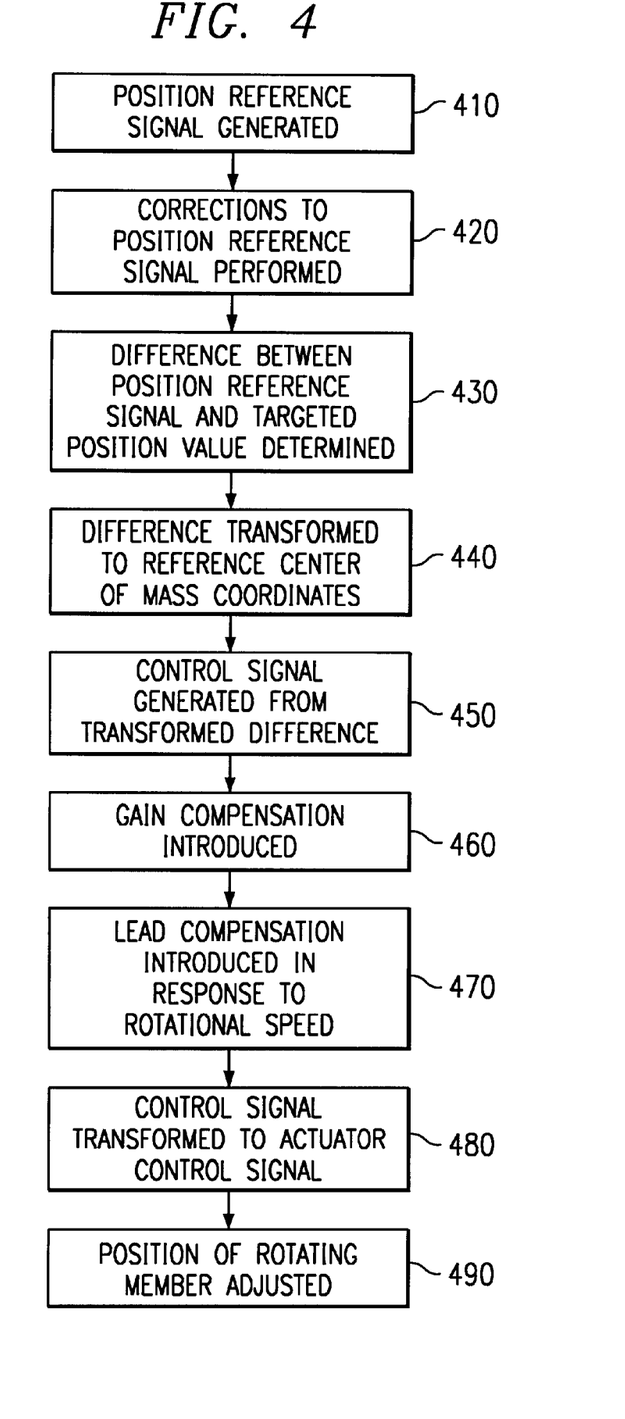
FIG. 4 illustrates a flow chart of a method of controlling the magnetic suspension of a rotating member by introducing phase lead in control signals.

FIG. 4 illustrates a flow chart of one embodiment of a method of controlling the magnetic suspension of a rotating member by introducing phase lead in control signals to address instability of the suspension. In step 410, a position reference signal is generated in response to a detected position of a rotating member suspended in a magnetic field. In steps 420 through 480, an actuator control signal is determined in response to receiving the position reference signal, the actuator control signal including a phase lead that is introduced in response to a rotational speed of the rotating member. More particularly, in step 420, the received position reference signal is corrected for errors associated with runout. In step 430, a difference or error is determined by comparing the position reference signal to a desired or targeted position value. In step 440, the determined difference or error is transformed to reference center of mass coordinates. In step 450, a control signal is generated from the transformed difference or error. In step 460, gain compensation is introduced in the control signal in response to the rotational speed of the rotating member. In step 470, lead compensation is introduced in the control signal in response to the rotational speed of the rotating member. Lead compensation may be introduced in step 470 by filtering the control signal using a notch filter or other suitable device in response to the rotational speed of the rotating member. Phase lead in the control signal may be introduced over a selected frequency range of the actuator control signal using a suitable lead compensator. Phase lead may also be introduced by adjusting a maximum phase lead frequency of a lead compensator in response to the rotational speed of the rotating member. In step 480, the compensated control signal is transformed into an actuator control signal that references forces to be applied relative to the rotating member when modifying the magnetic field. In step 490, the position of the rotating member is adjusted in response to the actuator control signal by modifying characteristics of the magnetic field.

Although the present invention has been described in detail, it should be understood that various changes, substitutions and alterations may be made hereto without departing from the spirit and scope of the invention as defined by the appended claims.

What is claimed is:

1. A system for controlling the position of a rotating member suspended using a magnetic field, the system comprising:
   at least one sensor that is operable to detect the position of the rotating member, the sensor further being operable to generate a position reference signal in response to the detected position;
   a controller in communication with the at least one sensor and being operable to generate an actuator control signal in response to receiving the position reference signal, the controller further operable to introduce a phase lead in the actuator control signal in response to a rotational speed of the rotating member; and
   at least one actuator in communication with the controller and being operable to adjust the position of the rotating member in response to the actuator control signal by modifying characteristics of the magnetic field.

2. The system of claim 1, wherein the controller comprises:
   a memory operable to store control equations; and
   a processor operable to access the memory and use the control equations to generate the actuator control signal in response to receiving the position reference signal, the processor further operable to introduce the phase lead in response to the stored control equations.

3. The system of claim 1, wherein the controller includes a notch filter that is operable to introduce the phase lead in the actuator control signal in response to the rotational speed of the rotating member.

4. The system of claim 1, wherein the controller includes a lead compensator that is operable to introduce the phase lead in the actuator control signal over a selected frequency range of the actuator control signal.

5. The system of claim 1, wherein the controller includes a tracking lead compensator that is operable to adjust a maximum phase lead frequency in response to the rotational speed of the rotating member.

6. The system of claim 1, wherein the controller includes feedforward compensation logic that is operable to compensate for currents caused by runout.

7. The system of claim 1, wherein the controller includes a plurality of notch filters that are operable to reduce harmonics of control currents.

8. The system of claim 1, wherein the rotating member is a flywheel suspended using magnetic bearings created by the magnetic field.

9. A method of controlling the position of a rotating member suspended using a magnetic field, the method comprising:
   generating a position reference signal in response to a detected position of the rotating member;
   determining an actuator control signal in response to the position reference signal, the actuator control signal including a phase lead introduced in response to a rotational speed of the rotating member; and
   adjusting the position of the rotating member in response to the actuator control signal by modifying characteristics of the magnetic field.

10. The method of claim 9, wherein determining the actuator control signal includes filtering the actuator control signal in response to the rotational speed of the rotating member in order to introduce the phase lead in the actuator control signal.

11. The method of claim 9, wherein determining the actuator control signal includes introducing the phase lead in the actuator control signal over a selected frequency range of the actuator control signal.

12. The method of claim 9, wherein determining the actuator control signal includes adjusting a maximum phase lead frequency in response to the rotational speed of the rotating member.

13. The method of claim 9, wherein determining the actuator control signal includes compensating for control currents caused by runout.

14. The method of claim 9, wherein adjusting the position of the rotating member includes adjusting magnetic bearings located proximate to a shaft coupled to the rotating member.

15. The method of claim 9, wherein determining the actuator control signal includes introducing the phase lead in response to calculations performed using control equations, the control equations used to calculate the phase lead being operable to change in response to the rotational speed of the rotating member.

16. The method of claim 9, wherein determining the actuator control signal includes:
   correcting for runout error;
   determining a difference between the position reference signal to a targeted position value;

transforming the determined difference to reference center of mass coordinates;

generating a control output signal from the transformed difference;

introducing gain compensation in the control output signal in response to the rotational speed of the rotating member;

introducing lead compensation in the control output signal in response to the rotational speed of the rotating member; and transforming the compensated control output signal into actuator control signals.

17. A system for controlling the position of a rotating member suspended using a magnetic field, the system comprising:

at least one sensor that is operable to detect the position of the rotating member, the sensor further being operable to generate a position reference signal in response to the detected position;

a summer in communication with the at least one sensor and being operable to compare the position reference signal to a targeted position value;

control logic in communication with the summer and being operable to generate a control output signal in response to the compared position reference signal and targeted position value;

at least one gain compensator in communication with the control logic and being operable to introduce gain in the control output signal;

at least one lead compensator in communication with the gain compensator and being operable to introduce phase lead in the control output signal, the amount of phase lead determined in response to the rotational speed of the rotating member; and at least one actuator responsive to the lead compensator and being operable to adjust the position of the rotating member in response to the control output signal by modifying characteristics of the magnetic field.

18. The system of claim 17, wherein the system further comprises at least one notch filter in communication with the lead compensator and operable to introduce phase lead in the control output signal, the amount of phase lead determined in response to the rotational speed of the rotating member.

19. The system of claim 17, wherein the system further comprises utilizing a feedforward control to reduce errors in detecting the position of the rotating member.

20. The system of claim 17, wherein the lead compensator is a tracking lead compensator that is operable to introduce phase lead in the control output signal, the amount of phase lead determined in response to the rotational speed of the rotating member.

21. A system for controlling a position of a rotating member suspended using a magnetic field, the system comprising:

at least one sensor operable to detect the position of the rotating member, the sensor further operable to generate a position reference signal based on the detected position;

a controller in communication with the sensor, the controller operable to generate an actuator control signal in response to receiving the position reference signal, the controller further operable to introduce a phase lead in the actuator control signal, the amount of the phase lead varying with the rotational speed of the rotating member; and at least one actuator in communication with the controller and being operable to adjust the position of the rotating member in response to the actuator control signal by modifying characteristics of the magnetic field.

22. The system of claim 21, wherein the controller includes a tracking notch filter operable to introduce the phase lead in the actuator control signal, the amount of the phase lead varying with the rotational speed of the rotating member.

23. The system of claim 21, wherein the controller includes a tracking lead compensator operable to continuously change a maximum phase lead frequency as the rotational speed of the rotating member changes.

24. The system of claim 21, wherein the controller includes feedforward compensation logic operable at all rotational speeds of the rotating member to compensate for currents caused by runout.

25. The system of claim 21, wherein the amount of the phase lead varies continuously with the rotational speed of the rotating member.

* * * * *

UNITED STATES PATENT AND TRADEMARK OFFICE
CERTIFICATE OF CORRECTION

PATENT NO. : 6,323,614 B1  
DATED : November 27, 2001  
INVENTOR(S) : Alan Palazzolo et al.

Page 1 of 1

It is certified that error appears in the above-identified patent and that said Letters Patent is hereby corrected as shown below:

<u>Column 2,</u>  
Line 67, after "System", insert -- 10 --.

Signed and Sealed this

Twenty-first Day of May, 2002

*Attest:*

*Attesting Officer*

JAMES E. ROGAN  
*Director of the United States Patent and Trademark Office*